(12) United States Patent
Kwon (10) Patent No.: US 11,420,585 B2
(45) Date of Patent: Aug. 23, 2022

(54) COVER DEVICE OF AIRBAG

(71) Applicant: HYUNDAI MOBIS CO., LTD., Seoul (KR)

(72) Inventor: Oh Koang Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/880,612

(22) Filed: May 21, 2020

(65) Prior Publication Data

US 2020/0369234 A1  Nov. 26, 2020

(30) Foreign Application Priority Data

May 22, 2019  (KR) .................. 10-2019-0059994

(51) Int. Cl.
*B60R 21/2165* (2011.01)
*B60R 21/207* (2006.01)
*B60R 21/215* (2011.01)
*B60R 21/217* (2011.01)

(52) U.S. Cl.
CPC .... *B60R 21/21656* (2013.01); *B60R 21/2165* (2013.01); *B60R 21/2176* (2013.01); *B60R 2021/21506* (2013.01); *B60R 2021/21537* (2013.01)

(58) Field of Classification Search
CPC .... B60R 21/21656; B60R 2021/21506; B60R 2021/21537; B60R 21/203; B60R 21/233; B60R 21/2342
See application file for complete search history.

(56) References Cited

U.S. PATENT DOCUMENTS

| | | | | |
|---|---|---|---|---|
| 5,730,460 A | * | 3/1998 | Niederman | B60R 21/21656 280/728.3 |
| 9,694,780 B1 | * | 7/2017 | Lowe | B60R 21/21656 |
| 2003/0178818 A1 | * | 9/2003 | Schneider | B60R 21/2165 280/728.3 |
| 2005/0263989 A1 | * | 12/2005 | Helmstetter | B60R 21/21656 280/728.3 |
| 2008/0036184 A1 | * | 2/2008 | Takagi | B60R 21/21656 280/728.3 |
| 2015/0123384 A1 | * | 5/2015 | Kwon | B60R 21/21656 280/728.3 |

* cited by examiner

*Primary Examiner* — James A English
*Assistant Examiner* — Daniel M. Keck
(74) *Attorney, Agent, or Firm* — H.C. Park & Associates, PLC (57) ABSTRACT

A cover device of an airbag including a cover unit formed with first tear lines, and able to be torn along the first tear lines; and a housing unit formed to extend in a direction from a rim of the cover unit, and formed with second tear lines. Portions of the housing unit are torn along the second tear lines and rotate by the cover unit, which is torn and rotates.

12 Claims, 8 Drawing Sheets

COVER DEVICE OF AIRBAG

CROSS-REFERENCE TO RELATED APPLICATION

This application claims priority from and the benefit of Korean Patent Application No. 10-2019-0059994, filed on May 22, 2019, which is hereby incorporated by reference for all purposes as if set forth herein.

BACKGROUND

Field

Exemplary embodiments relate to a cover device of an airbag, and more particularly, to a cover device of an airbag capable of preventing a safety accident in which a passenger is injured due to the release of a cover unit.

Discussion of the Background

In general, an airbag device is a device which protects an occupant with a cushioning force as an airbag cushion is inflated by the pressure of a gas introduced therein when a vehicle accident occurs. Airbag devices include a driver seat airbag device which is mounted on a steering wheel, a passenger seat airbag device which is mounted over a glove box, a knee airbag device which is mounted on an instrument panel, a curtain airbag device which is mounted along a roof rail, and a side airbag device which is mounted to the side surface of a seat. The driver seat airbag device includes an inflator which generates a gas and an airbag cushion which is inflated and deployed to protect a driver when the gas generated from the inflator is introduced therein. The airbag cushion is kept in a folded state in the steering wheel when a vehicle accident does not occur, and is unfolded and deployed when a vehicle accident occurs and the gas generated from the inflator is introduced therein. An airbag cover which covers the surface of the steering wheel receiving the airbag cushion is formed with tear lines, and is torn along the tear lines when the airbag cushion is deployed. The airbag cover is torn along the tear lines, and a hinge portion is provided at an end portion of the airbag cover where the tear lines end and allows the airbag cover to rotate thereabout and thereby open the surface of the steering wheel. However, since the area of the hinge portion is narrow and thus a stress is concentrated on the hinge portion, the airbag cover may be completely torn to be released from the hinge portion, thereby causing an injury to the driver. Therefore, there is a need to solve such a problem.

The above information disclosed in this Background section is only for enhancement of understanding of the background of the invention and, therefore, it may contain information that does not constitute prior art.

SUMMARY

Features of the invention will be set forth in the description which follows, and in part will be apparent from the description, or may be learned by practice of the invention.

Exemplary embodiments of the invention provide a cover device of an airbag capable of preventing a safety accident in which a passenger is injured as a cover unit is released.

An exemplary embodiment of the invention provides a cover device of an airbag including: a cover unit formed with first tear lines, and able to be torn along the first tear lines; and a housing unit formed to extend in a direction from a rim of the cover unit, and formed with second tear lines, wherein portions of the housing unit are torn along the second tear lines and rotate by the cover unit which is torn and rotates.

The cover device may further include first hinge units positioned between ends of the first tear lines, and connected with the cover unit and the housing unit.

The housing unit may include an outer housing part connected with the first hinge units, and formed with the second tear lines, wherein portions of the outer housing part are torn along the second tear lines and rotate along with the cover unit; and an inner housing part disposed inside the outer housing part, and connected with the cover unit, the first hinge units and the outer housing part.

The second tear lines may be disposed in a lengthwise direction on the outer housing part.

The second tear lines may be disposed on lines, respectively, which meet with the ends of the first tear lines.

The second tear lines may be disposed on an inner surface of the outer housing part.

The outer housing part may include outer base housing portions connected with the inner housing part; outer rotating housing portions connected with the first hinge units and the inner housing part, and rotating when the cover unit rotates; and the second tear lines formed between the outer base housing portions and the outer rotating housing portions.

When the cover unit rotates about the first hinge units, the outer rotating housing portions may be torn along the second tear lines, may be separated from the outer base housing portions, and may rotate together with the cover unit.

The inner housing part may include second hinge portions connected with the first hinge units and the outer rotating housing portions; and an inner body housing portion connected with the second hinge portions and the cover unit, and disposed to be spaced apart from the outer housing part.

When the first tear lines and the second tear lines are torn, the cover unit and the outer rotating housing portions may rotate about the first hinge units and the second hinge portions.

In the cover device of an airbag according to the embodiments of the disclosure, as portions of an outer housing part, that is, outer rotating housing portions, are torn along second tear lines formed in the outer housing part and rotate together with a cover unit, hinge regions may be widened to prevent the cover unit from being released from first hinge units due to stress concentrations on the first hinge units, thereby preventing a safety accident in which a passenger is injured.

Also, in the cover device of an airbag according to the embodiments of the disclosure, since the second tear lines are not only disposed in a lengthwise direction on the outer housing part but also disposed to meet with ends of first tear lines, respectively, when the cover unit rotates about the first hinge units, the second tear lines may be easily torn to widen the hinge regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Herein below, a cover device of an airbag in accordance with an embodiment of the disclosure will be described with reference to attached drawings.

It should be noted that the drawings are not to precise scale and may be exaggerated in thickness of lines or sizes of components for descriptive convenience and clarity only. Furthermore, the terms used herein are defined by taking functions of the invention into account and can be changed according to the intention of users or operators or the practice. Therefore, definition of the terms should be made according to the overall disclosures set forth herein.

Figure 1:
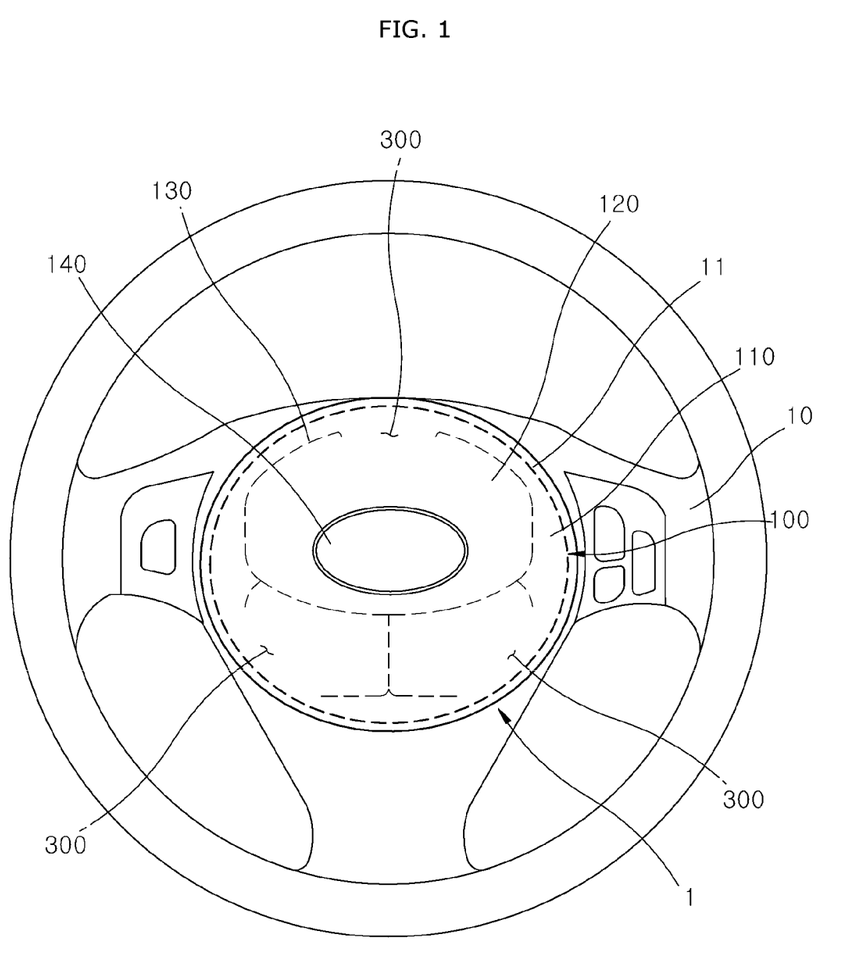
FIG. 1 is a view schematically illustrating a cover device of an airbag in accordance with an embodiment of the disclosure.
Figure 2:
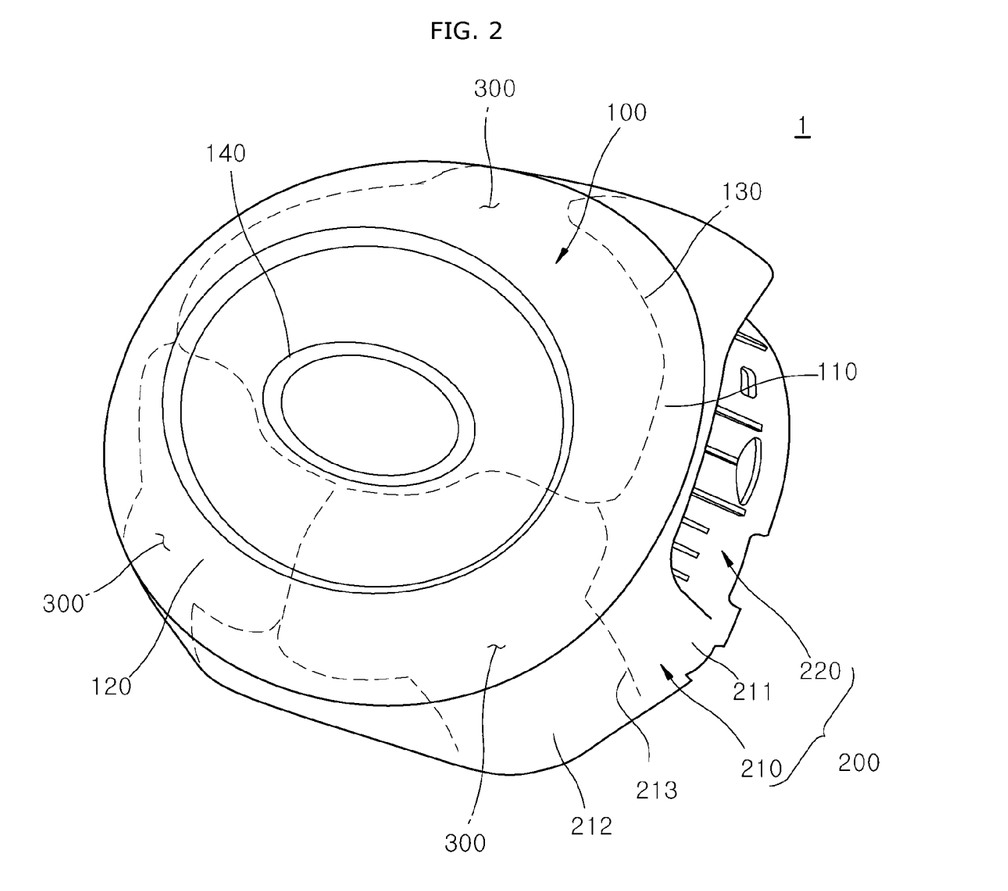
FIG. 2 is a perspective view of the cover device of an airbag in accordance with the embodiment of the disclosure.
Figure 3:
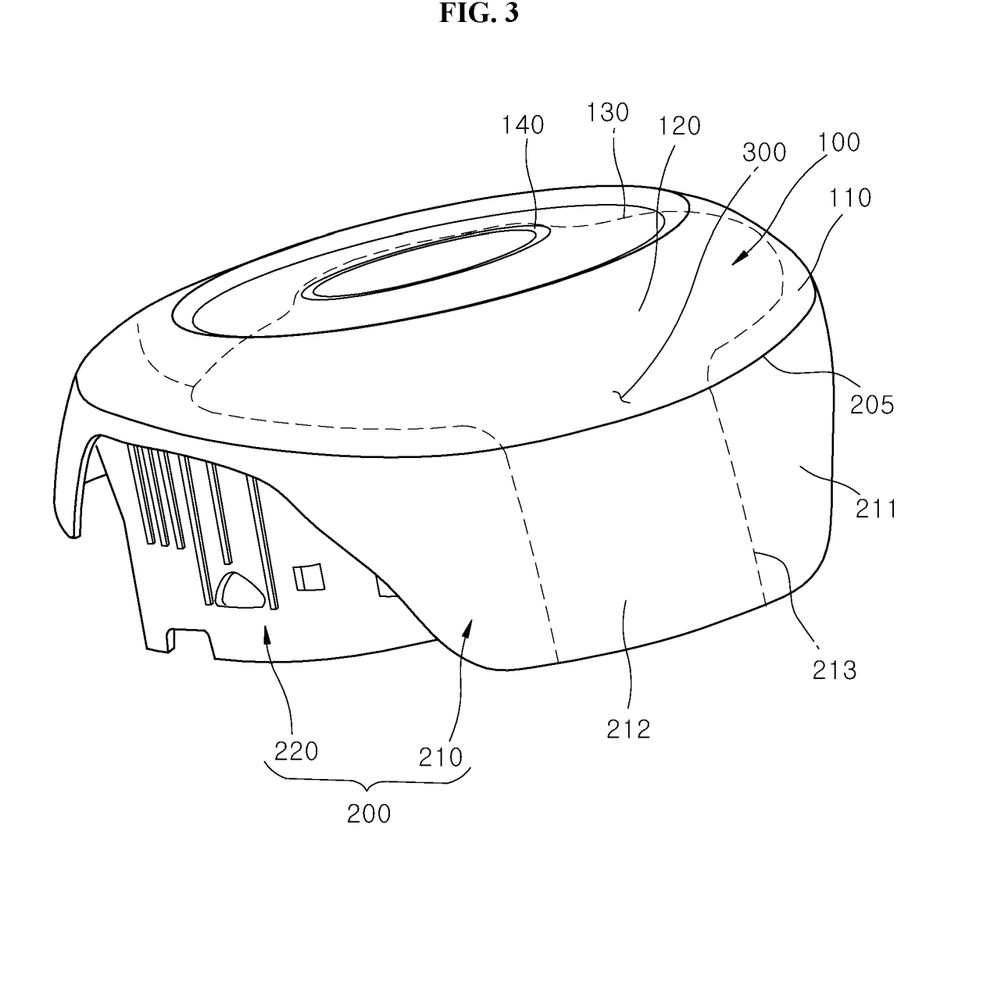
FIG. 3 is a perspective view when the cover device of an airbag in accordance with the embodiment of the disclosure is viewed in a different direction.
Figure 4:
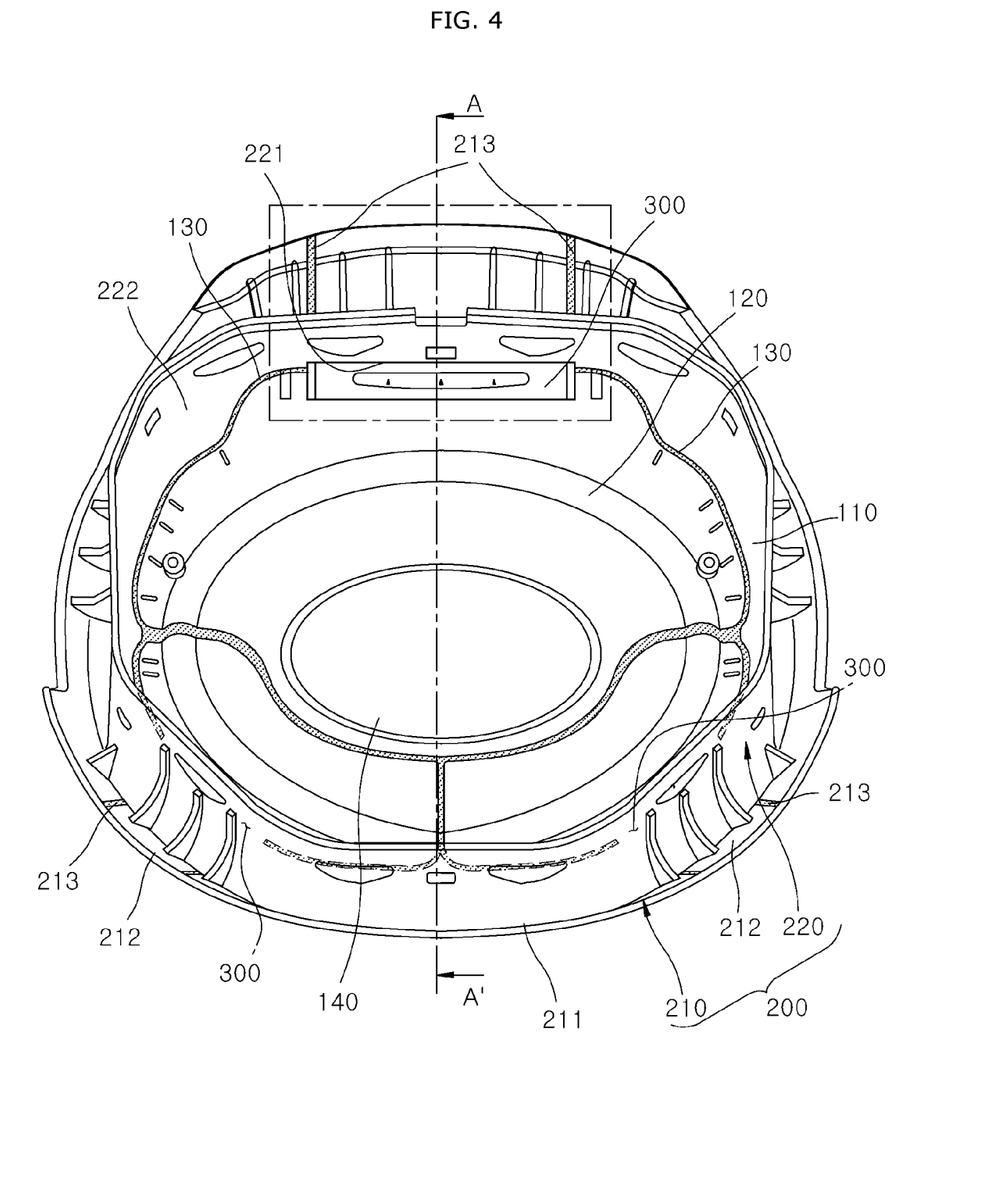
FIG. 4 is a bottom view of the cover device of an airbag in accordance with the embodiment of the disclosure.
Figure 5:
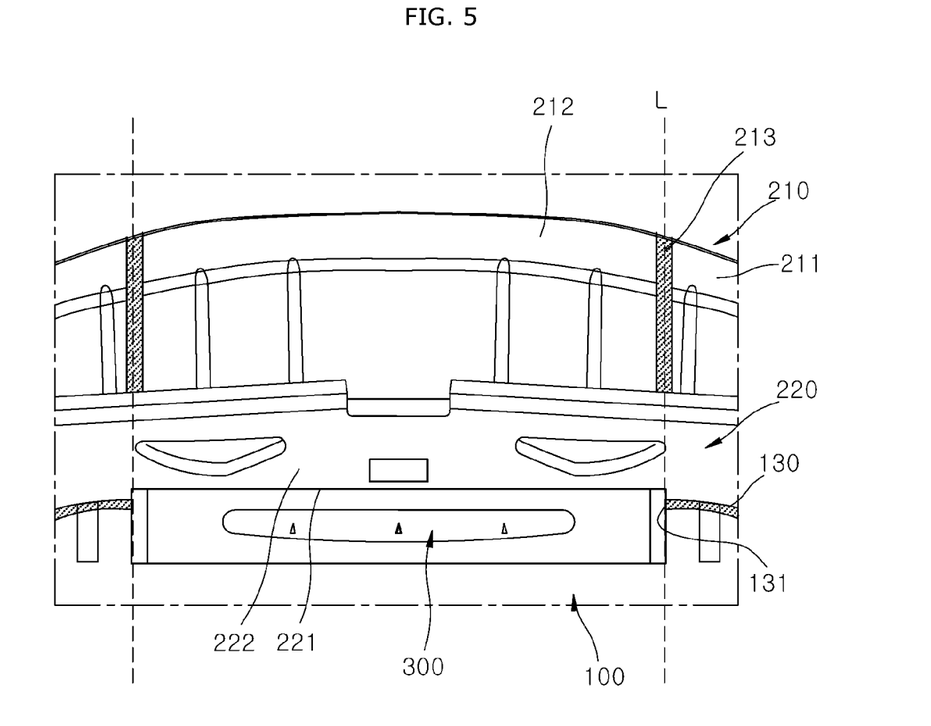
FIG. 5 is a partial enlarged view of FIG. 4.
Figure 6:
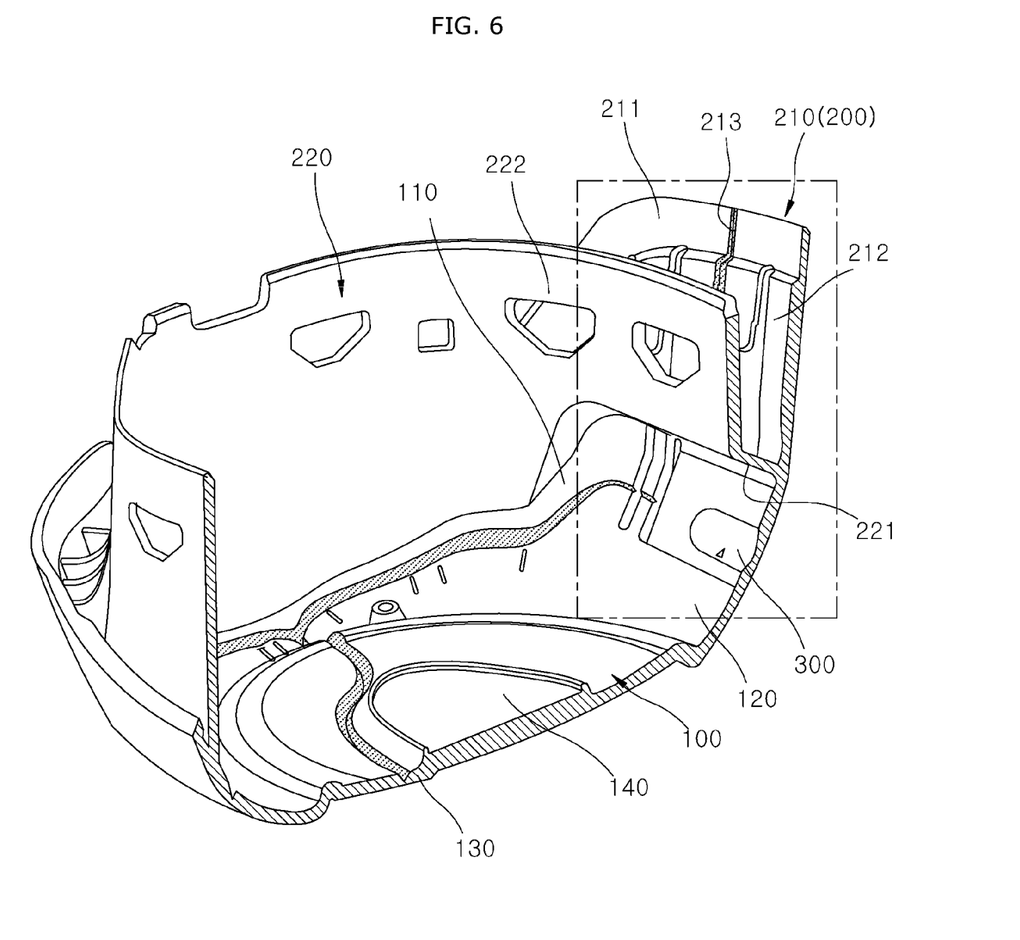
FIG. 6 is a cross-sectional view taken along the line A-A' of FIG. 4.
Figure 7:
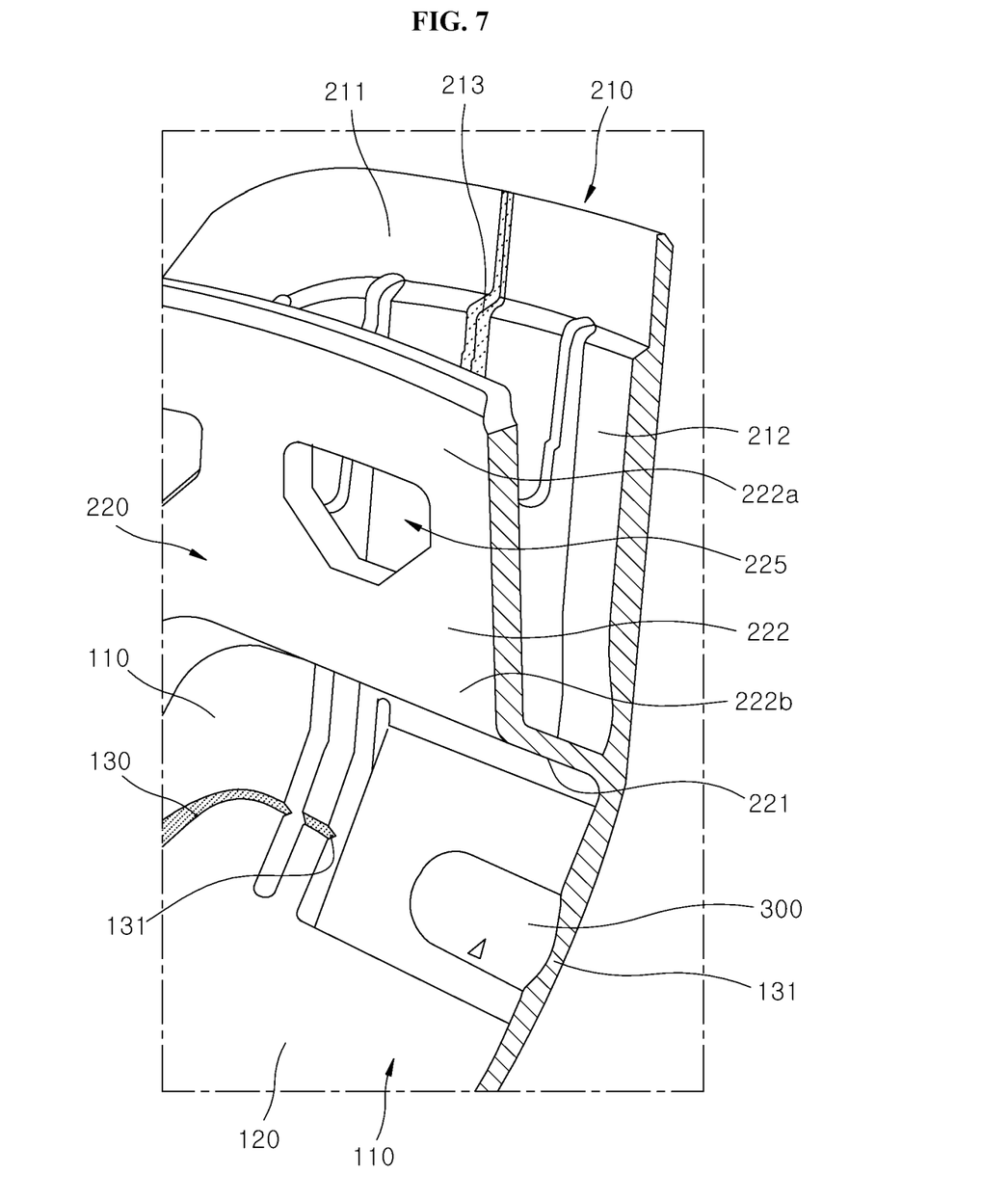
FIG. 7 is a partial enlarged view of FIG. 6.
Figure 8:
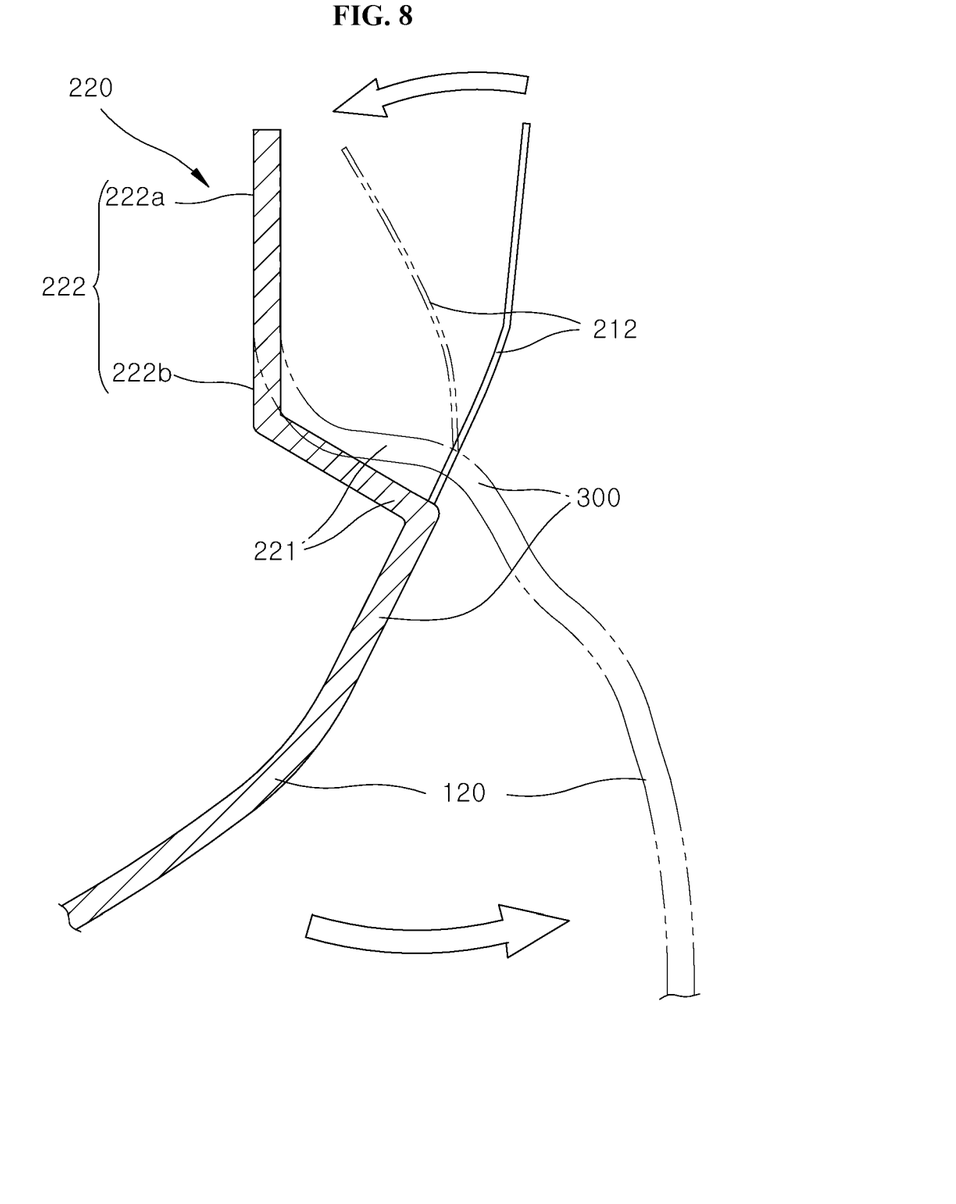
FIG. 8 is a view schematically illustrating a state in which a cover unit of the cover device of an airbag in accordance with the embodiment of the disclosure is torn.

FIG. 1 is a view schematically illustrating a cover device of an airbag in accordance with an embodiment of the disclosure; FIG. 2 is a perspective view of the cover device of an airbag in accordance with the embodiment of the disclosure; FIG. 3 is a perspective view when the cover device of an airbag in accordance with the embodiment of the disclosure is viewed in a different direction; FIG. 4 is a bottom view of the cover device of an airbag in accordance with the embodiment of the disclosure; FIG. 5 is a partial enlarged view of FIG. 4; FIG. 6 is a cross-sectional view taken along the line A-A' of FIG. 4, FIG. 7 is a partial enlarged view of FIG. 6; and FIG. 8 is a view schematically illustrating a state in which a cover unit of the cover device of an airbag in accordance with the embodiment of the disclosure is torn.

Referring to FIGS. 1 to 4, a cover device 1 of an airbag in accordance with an embodiment of the disclosure includes a cover unit 100, a housing unit 200, and first hinge units 300.

The cover unit 100 is formed with first tear lines 130, and may be torn along the first tear lines 130. The cover unit 100 covers an opening 11 which is formed at the center portion of a steering wheel 10.

In detail, a space (not illustrated) which communicates with the opening 11 is formed in the center portion of the steering wheel 10. An airbag cushion (not illustrated) is received in the space by being folded or packaged, and the housing unit 200 which will be described below is coupled to the space. The cover unit 100 which is connected with the housing unit 200 covers the opening 11 of the steering wheel 10. An emblem 140 is formed on the outer surface of the cover unit 100. The first tear lines 130 are formed on the inner surface of the cover unit 100. When the airbag cushion is deployed, the cover unit 100 is torn along the first tear lines 130, and is divided into a plurality portions. An airbag cushion being deployed may be referred to as an airbag event, but embodiments are not limited thereto. An airbag event may include an airbag cushion being inflated or the airbag cushion being in the process of being deployed.

The cover unit 100 includes a cover base 110, a cover body 120, and the first tear lines 130. The cover base 110 is connected with the housing unit 200 which will be described below. The cover body 120 covers the opening 11 of the steering wheel 10. The first tear lines 130 are formed between the cover base 110 and the cover body 120 and between adjacent portions of the cover body 120 (see FIG. 4). When the airbag cushion is deployed, the cover body 120 is torn along the first tear lines 130 to be divided into a plurality portions, and is separated from the cover base 110 to rotate about the first hinge units 300 which will be described below.

The housing unit 200 is formed to extend substantially perpendicularly from a rim 205 of the cover unit 100, is formed with second tear lines 213, and is partially torn along the second tear lines 213 and rotates by the cover unit 100 which is torn and rotates. The housing unit 200 is disposed in the space of the steering wheel 10, and is coupled to the steering wheel 10.

As illustrated in FIGS. 2 to 8, since the second tear lines 213 are formed on the inner surface of an outer housing part 210 of the housing unit 200, when the cover unit 100 is torn along the first tear lines 130 and rotates about the first hinge units 300 which will be described below, portions of the outer housing part 210 are torn along the second tear lines 213 and rotate by the rotational force of the cover unit 100. Due to this fact, as hinge regions are widened and extended, stresses may be dispersed.

Each first hinge unit 300 is positioned between ends 131 of the first tear lines 130, and connects the cover unit 100 and the housing unit 200 (see FIGS. 4 and 5). That is to say, when the cover unit 100 is torn along the first tear lines 130, the cover unit 100 rotates about the first hinge units 300.

The housing unit 200 includes the outer housing part 210 and an inner housing part 220. The outer housing part 210 is connected with the first hinge units 300, and is formed with the second tear lines 213. When the cover unit 100 rotates, the portions of the outer housing part 210 are torn along the second tear lines 213 and rotate together with the cover unit 100. When the cover unit 100 is torn along the first tear lines 130 and rotates, the portions of the outer housing part 210, that is, outer rotating housing portions 212, which are positioned between the second tear lines 213 of the outer housing part 210, are torn along the second tear lines 213 and rotate together with the cover unit 100.

The inner housing part 220 is disposed inside the outer housing part 210, and is coupled to the steering wheel 10. The inner housing part 220 is connected with the cover unit 100, the first hinge units 300 and the outer housing part 210. According to this fact, the cover unit 100 and the outer rotating housing portions 212 of the outer housing part 210 which are torn along the first tear lines 130 and the second tear lines 213 may rotate about the first hinge units 300 and second hinge portions 221 of the inner housing part 220.

In this way, since the second tear lines 213 are formed in the outer housing part 210, when the cover unit 100 is torn along the first tear lines 130 and rotates, the portions of the outer housing part 210, that is, the outer rotating housing portions 212, are torn along the second tear lines 213 and rotate together with the cover unit 100. As portions of the inner housing part 220, that is, the second hinge portions 221, serve as hinges together with the first hinge units 300, the hinge regions may be widened, and thus, it is possible to prevent stresses from being concentrated on the first hinge units 300. As a result, it is possible to prevent the first hinge units 300 from being completely torn and thus the cover unit 100 from being released from the first hinge units 300, thereby preventing a safety accident in which a passenger is injured.

The second tear lines 213 are disposed in a lengthwise direction on the outer housing part 210. Each of the second tear lines 213 is disposed on a line L which meets with each end 131 of each of the first tear lines 130. The second tear lines 213 are disposed on the inner surface of the outer housing part 210.

As illustrated in FIGS. 4 and 5, the second tear lines 213 are disposed in a plural number on the inner surface of the outer housing part 210, are disposed long in a vertical direction (when viewed in FIG. 3) on the outer housing part 210, and are positioned on lines L, respectively, which meet with the ends 131 of the first tear lines 130. Due to this fact, when the cover unit 100 rotates about the first hinge units 300, the second tear lines 213 may be easily torn to widen the hinge regions.

The outer housing part 210 includes outer base housing portions 211, the outer rotating housing portions 212, and the second tear lines 213. The outer base housing portions 211 are connected with the inner housing part 220. The outer rotating housing portions 212 are connected with the first hinge units 300 and the inner housing part 220, and rotate when the cover unit 100 rotates. The second tear lines 213 are formed between the outer base housing portions 211 and the outer rotating housing portions 212 (see FIGS. 6 and 7).

When the airbag cushion is deployed, the cover unit 100 is torn along the first tear lines 130 to be divided into the plurality of portions, and rotates about the first hinge units 300. When the cover unit 100 rotates about the first hinge units 300, the outer rotating housing portions 212 are torn along the second tear lines 213, are separated from the outer base housing portions 211, and rotate together with the cover unit 100.

The inner housing part 220 includes the second hinge portions 221 and an inner body housing portion 222. As illustrated in FIGS. 6 to 8, the second hinge portions 221 are connected with the first hinge units 300 and the outer rotating housing portions 212. When the first tear lines 130 and the second tear lines 213 are torn, the cover unit 100 and the outer rotating housing portions 212 rotate about the first hinge units 300 and the second hinge portions 221. Namely, since the second hinge portions 221 serve as hinges together with the first hinge units 300, the hinge regions may be widened to prevent stresses from being concentrated on the first hinge units 300, unlike the conventional art, thereby preventing the cover unit 100 from being completely torn and being released from the first hinge units 300. That is to say, since the hinge regions are widened to disperse stresses, it is possible to prevent the cover unit 100 from being released from the first hinge units 300.

The inner body housing portion 222 is connected with the second hinge portions 221 and the cover unit 100, and is disposed to be spaced apart from the outer housing part 210. The inner body housing portion 222 is formed in a cylindrical shape to extend substantially perpendicularly from the rim 205 or top of the cover unit 100, is disposed inside the outer housing part 210, and is coupled to the steering wheel 10. The inner body housing portion 222 is connected with the second hinge portions 221 which connect the first hinge units 300 and the outer housing part 210.

The inner body housing portion 222 may have attachment holes 225 configured to attach to the steering wheel 10. Above (as illustrate d in FIG. 7) the attachment holes 225 are disposed upper portions 222a of the inner body housing portion 222. The upper portions 222a and the attachment holes 225 are configured to stay attached to the steering wheel 10 during an airbag event. The upper portions 222a may be referred to as an attachment part. During an airbag event, the attachment part 222a does not rotate about the steering wheel 10 as do other parts of the housing unit 200.

The inner body housing portion 222 also includes lower portion 222b below the attachment holes 225. The lower portions 222b of the inner body housing portion 222 may rotate along with other portion of the housing unit 200 and first hinge units 300 during an airbag event. This is illustrated in FIG. 8 that shows airbag event rotation of the cover body including lower portions 222b, second hinge portions 221, first hinge units 300, outer rotating housing portions 212, while upper portions 222a of the inner body housing portion 222 remain in place, not moving, This upper attachment allows the cover unit 100 to remain fixedly attached to the steering wheel during airbag deployment. The cover unit 100 may not become detached from the steering wheel 10 and injure a driver.

Hereinafter, the operation and effects of the cover device 1 of an airbag in accordance with the embodiment of the disclosure will be described with reference to FIGS. 4 to 8.

When the airbag cushion is deployed, the cover unit 100 is torn along the first tear lines 130 and is divided into the plurality portions. The cover unit 100 divided into the plurality of portions and rotates about the first hinge units 300. When the cover unit 100 rotates about the first hinge units 300, the outer rotating housing portions 212 of the outer housing part 210 are torn along the second tear lines 213 and rotate. As a consequence, the cover unit 100 and the outer rotating housing portions 212 rotate about the first hinge units 300 and the second hinge portions 221 of the inner housing part 220. As a result, since the hinge regions are widened, it is possible to prevent stresses from being concentrated on the first hinge units 300, thereby preventing a safety accident in which the cover unit 100 is released to injure a passenger.

Although the disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the disclosure as defined in the accompanying claims.

What is claimed is:

1. A cover device of an airbag, comprising:
    a cover unit formed with first tear lines thereon, such that the cover unit is torn along the first tear lines during an airbag event;
    a rim formed on the cover unit, the rim having an outer surface; and
    a housing unit including an inner housing part formed inside the outer surface of the rim and extending a length, and an outer housing part formed to extend in a direction from the outer surface of the rim to substantially a same length as the inner housing part, and the outer housing part formed with second tear lines to an outer edge of the outer housing part,
    wherein the outer housing part of the housing unit are torn along the second tear lines and rotate about the cover unit, which is torn and rotates when the airbag is deployed.

2. The cover device according to claim 1, further comprising:
    first hinge units positioned between ends of the first tear lines, and connected with the cover unit and the housing unit.

3. The cover device according to claim 2, wherein the outer housing part is connected with the first hinge units, and formed with the second tear lines, wherein portions of the outer housing part are torn along the second tear lines and rotate along with the cover unit during the airbag event and the
    inner housing part is disposed inside the outer housing part, and connected with the cover unit, the first hinge units and the outer housing part.

4. The cover device according to claim 3, wherein the second tear lines are disposed in a lengthwise direction on the outer housing part.

5. The cover device according to claim 4, wherein the second tear lines are disposed on lines, respectively, which meet with the ends of the first tear lines.

6. The cover device according to claim 3, wherein the second tear lines are disposed on an inner surface of the outer housing part.

7. The cover device according to claim 3, wherein the outer housing part comprises:
    outer base housing portions connected with the inner housing part;
    outer rotating housing portions connected with the first hinge units and the inner housing part, the outer rotating housing portions rotating when the cover unit rotates during the airbag event; and
    the second tear lines formed between the outer base housing portions and the outer rotating housing portions.

8. The cover device according to claim 7, wherein, when the cover unit rotates about the first hinge units, the outer rotating housing portions are torn along the second tear lines, are separated from the outer base housing portions, and rotate together with the cover unit.

9. The cover device according to claim 7, wherein the inner housing part comprises:
    second hinge portions connected with the first hinge units and the outer rotating housing portions; and
    an inner body housing portion connected with the second hinge portions and the cover unit, and disposed to be spaced apart from the outer housing part.

10. The cover device according to claim 9, wherein, when the first tear lines and the second tear lines are torn, the cover unit and the outer rotating housing portions rotate about the first hinge units and the second hinge portions.

11. A cover device, comprising:
    a cover unit having a cover base and a plurality of tear lines disposed thereon;
    a housing unit extending from the cover base, the housing unit including an outer housing part extending a length and an inner housing part disposed inside the outer housing part and extending substantially a same length as the outer housing part;
    first tear lines disposed on the inner housing part and second tear lines disposed on the outer housing part extending to an outer edge of the outer housing part;
    first hinge units positioned between ends of the first tear lines and second hinge units connected between the outer housing part and the inner housing part,
    wherein upon an airbag event the outer housing part rotates toward the inner housing part about the first hinge units and the second hinge units.

12. The cover device of claim 11, wherein the inner housing part includes attachment holes configured to be attached to a steering wheel and an attachment part adjacent the attachment holes that does not rotate during the airbag event.

* * * * *